3,331,791
POLYURETHANE FOAMS PRODUCED FROM MONOAMINE TRIOLS
Michael Cuscurida, Austin, Tex., assignor to Jefferson Chemical Company, Inc., Houston, Tex., a corporation of Delaware
No Drawing. Filed Nov. 4, 1963, Ser. No. 321,367
4 Claims. (Cl. 260—2.5)

This invention relates to an improved polyurethane foam. More particularly, this invention relates to a one-step method for the preparation of a polyurethane foam from a mixture of polyethers proportioned so as to provide a polyurethane foam of improved physical properties.

It is known to prepare foamed polyurethanes by the reaction of a polyisocyanate with a polyol and water in the presence of a catalyst system. The catalyst system normally comprises one or more tertiary amines, one or more organic tin compounds and a foam stabilizing agent. With a system of this type, it is possible to obtain a flexible polyurethane foam by a one-step reaction involving the polyisocyanate, the polyol and water. See, for example, the Du Pont foam bulletin entitled, "Evaluation of Some Polyols in One-Shot Resilient Foams," dated Mar. 22, 1960.

A particularly desirable polyol for the production of flexible polyurethane foams has been found to be a polyoxypropylene triol having an average molecular weight of about 2,000 to 4,000 and a hydroxyl number of about 40 to 60. A particularly desirable class of polyethers are the propylene oxide condensates of glycerol or trimethylolpropane having an average molecular weight of about 2,500 to 3,500.

Although generally satisfactory results have been obtained through the use of polyether triols, there has been much left to desire in the physical properties of the polyurethane foam, particularly with respect to load-bearing properties.

It has now been found that when from about 5 to about 40 wt. percent of the polyether triol is replaced with an equivalent weight of a glycol monoamine, a urethane foam is provided which has improved tensile and elongation properties.

The polyether triol to be used in accordance with the present invention is a propylene oxide condensate of an initiator containing an average of three reactive hydrogen atoms as determined by the Zerewitinoff test such as polyhydric alcohols (e.g., glycerol trimethylol propane, etc., and mixtures thereof).

The amount of propylene oxide reacted with the triol should be sufficient to provide a triol having a molecular weight within the range of 2,000 to about 4,000, and more preferably, within the range of 2,500 to about 3,500. The hydroxyl number is suitably within the range of 20 to about 80, and more preferably, within the range of about 40 to about 60. It will be understood that up to about 20 wt. percent of the propylene oxide may be replaced with an equivalent weight of ethylene oxide which is incorporated into the triol molecule either as oxyethylene groups adjacent to the initiator or adjacent to chain endings of the triol, or incorporated with all or part of the propylene oxide during condensation to provide a heteric mixture.

The monoamine to be employed in accordance with the present invention may be represented by the following structural formula:

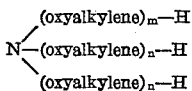

wherein the term "oxyalkylene" includes both propylene oxide and ethylene oxide, with the proviso that from 80 to 100 wt. percent of the oxyalkylene groups are oxypropylene groups. In the above formula, $m$ is an integer having a value of from about 2 to about 60, and more preferably, from about 15 to about 55, and $n$ is an integer having a value of 0 to 3, and more preferably, 0 to 1.

A preferred group of monoamines is represented by the following formula:

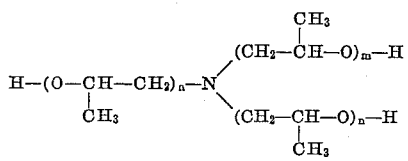

wherein $m$ is a positive integer having a value of 15 to 55, and $n$ is a positive integer having a value of 0 to 1.

The monoamine product of the present invention may be conveniently prepared by reacting monoethanolamine with propylene oxide, or a mixture of propylene oxide and ethylene oxide as disclosed and claimed, for example, in copending Speranza et al. application Ser. No. 860,317, filed Dec. 18, 1959, and entitled, "Method for Preparing Basic Polyether Compositions," now U.S. Patent No. 3,110,732. As disclosed therein, an alkanolamine such as a monoethanolamine is reacted with a carbonyl compound such as methylisobutyl ketone to provide a Schiff base and then oxyalkylated with propylene oxide or ethylene oxide, or mixtures thereof, to provide a condensation product which is recovered and hydrolyzed with water to provide a basic primary amine composition.

A basic polyether composition prepared in this fashion may be utilized as such or may be further reacted with a small amount of ethylene oxide or propylene oxide, or a mixture thereof, in the absence of a catalyst whereby the hydrogen atoms on the primary amine group may be reacted with from one to three mols of ethylene oxide and propylene oxide.

In any event, the resultant primary amine is characterized by having only one polyether chain of appreciable length in the molecule.

It will be understood that when ethylene oxide is to be utilized as a coreactant with propylene oxide, the polyether may be prepared by first reacting all of the ethylene oxide with a monoethanolamine Schiff base to form a polyoxyethylene intermediate, following which the intermediate is reacted with propylene oxide to provide the desired molecular weight. Alternately, the propylene oxide may be added first, followed by the ethylene oxide.

As further alternates, heteric segments may be provided by initially reacting a mixture of ethylene oxide and propylene oxide with the Schiff base, followed by propylene oxide, or, conversely, by initially reacting the Schiff base with propylene oxide, followed by a mixture of ethylene oxide and propylene oxide.

As a further alternate, the propylene oxide and ethylene oxide may be employed as a premixture.

As thus prepared, the polyether monoethanolamine of the present invention will have a molecular weight within the range of from about 500 to about 4,000.

In preparing a flexible polyurethane foam, the triol component and the monoamine component are reacted with a polyisocyanate in the presence of an appropriate catalyst system and other conventional additives.

The isocyanate component to be employed in accordance with the present invention should be an organic diisocyanate such as an aliphatic or arylene diisocyanate. Representative diisocyanates include diphenyl diisocyanate, triphenyl diisocyanate, p-phenylene diisocyanate, p-tolylene diisocyanate (such as mixtures of 2,4- and 2,6- isomers), diphenyl methane-p,p'-diisocyanate, xylene-1,3-diisocyanate, furfurylidene diisocyanate, ethylene diisocyanate, propylene diisocyanate, tetramethylene diisocyanate, pentamethylene diisocyanate, octamethylene diisocyanate, undecamethylene diisocyanate, dodecamethylene diisocyanate, 3,3'-diisocyanato dipropylether, cyclopentylene-1,3-diisocyanate, cyclohexylene-1,3-diisocyanate, etc., and mixtures thereof.

The amount of polyether to be used relative to the polyisocyanate should normally be such that the isocyanato groups are present in at least an equivalent amount, and preferably in slight excess, as compared with the free hydroxyl groups. Preferably, the two ingredients will be proportioned so as to provide from about 1.05 to about 1.5 mol equivalents of isocyanato groups per mol of hydroxyl groups.

Gas for the foaming step in preparing flexible polyurethane foam may be derived by way of a carbon dioxide liberating water-isocyanate reaction.

When the gas is to be generated solely by way of carbon dioxide liberation as the result of the water-isocyanate reaction, it will be manifest that water should be present in the charge ingredients and that an excess of isocyanate must be employed. When an inert blowing agent such as halogenated normally liquid hydrocarbon, air, natural gas, carbon dioxide, etc., is employed, the amount of excess isocyanate may be substantially reduced. However, for the most efficient practice of the one-step method of the present invention, it is preferable that only about 50% to 90% of water normally required for foam generation be replaced by the extraneous blowing agent.

An appropriate catalyst is employed such as an organic tin catalyst or tertiary amine catalyst. Preferably, a mixture of the two is employed. The catalyst system will suitably employ an amount within the range of about 0.01% to about 1%, based on the combined weight of the polyether component and the diisocyanate component.

Representative tertiary amines that may be employed include trialkylamines such as trimethylamine, triethylamine, tripropylamine, tributylamine, alkyl-substituted polyamines such as pentamethyldiethylenetriamine, tetramethyl, 1,4-butylenediamine, tetramethylethylenediamine, etc., heterocyclic amines such as triethylenediamine, N,N'-dimethylpiperazine, N,N'-diethylpiperazine, N-methylmorpholine, N-ethylmorpholine, N-propylmorpholine, N-butylmorpholine, tetramethyl-1,3-butanediamine, 1-methyl-4-dimethylaminoethylpiperazine, 1-ethyl-4-diethylaminoethylpiperazine, 1,4-bis(3-dimethylaminopropyl)piperazine, etc., and mixtures thereof.

The organic tin compound may suitably be a stannous or a stannic compound such as a stannous salt of a carboxylic acid, a trialkyltin oxide, a dialkyltin dihalide, a dialkyltin oxide, etc., wherein the organic groups of the organic portion of the tin components are hydrocarbon groups containing one to eight carbon atoms. For example, dibutyltin dilaurate, dibutyltin diacetate, di-2-ethylhexyltin oxide, dioctyltin oxide, stannous octoate, stannous oleate, diethyltin diacetate, dihexyltin diacetate, stannous acetate, stannous adipate, stannous benzoate, stannous naphthanate, stannous butylate, stannous caprylate, etc., and mixtures thereof, may be used.

Other conventional additives such as pigments, dyes, silicone-type foam stabilizing agents, detergent-type foam stabilizing agents, etc., may also be employed.

The invention will be further illustrated with respect to the following examples, which are given by way of illustration and not as a limitation on the scope of this invention.

*Example I*

Hand-mixed, one-shot foams were prepared from a standard procedure and formulation in which the 3,000 molecular weight glycerol-propylene oxide adduct was replaced with 5% to 40% of an amine having an average molecular weight of about 2,000 and the average formula:

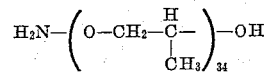

All foams were prepared in the following manner. All reactants except the toluene diisocyanate were stirred one minute at 1,400 r.p.m. using two 1.5 in. stainless steel, propeller-type agitators. The toluene diisocyanate was then added and the stirring continued an additional 10 to 12 seconds. After rising to full height, the foams were cured one hour at 73° C., crushed, and then cured 24 hours at 73° C. before testing. Results of this work are given in the following table.

TABLE I

| Formulation, p.b.w. | Foam No. | | | | |
|---|---|---|---|---|---|
| | 2154–40a | 2201–38b | 2201–39a | 2186–33a | 2201–39b |
| Triol | 200 | 190 | 180 | 160 | 120 |
| Amine, (percent) | 0, (0) | 10, (5) | 20, (10) | 40, (20) | 80, (40) |
| Triethylenediamine | 0.2 | 0.2 | 0.2 | 0.2 | 0.2 |
| Water | 5.8 | 5.8 | 5.8 | 5.8 | 5.8 |
| Silicone oil | 2 | 2 | 2 | 2 | 2 |
| N-ethylmorpholine | 1 | 1 | 1 | 1 | 1 |
| Stannous octoate | 0.6 | 0.6 | 0.6 | 0.6 | 0.6 |
| Toluene diisocyanate | 80 | 80 | 80 | 80 | 80 |
| Physical Properties: | | | | | |
| Density, pcf | 2.3 | 2.1 | 2.1 | 2.1 | 2.0 |
| Compression set,[1] percent | 6.7 | 9.7 | 9.4 | 7.0 | 6.6 |
| Tensile strength, p.s.i | 14.5 | 16.9 | 19.0 | 17.8 | 13.3 |
| Ultimate elongation, percent | 215 | 209 | 274 | 252 | 279 |
| Tear resistance, p.s.i | 3.6 | 3.1 | 3.2 | 3.3 | 2.5 |
| Compression-deflection: | | | | | |
| P.s.i. at 25% deflection | 0.53 | 0.40 | 0.49 | 0.47 | 0.33 |
| P.s.i. at 50% deflection | 0.72 | 0.53 | 0.65 | 0.65 | 0.46 |

[1] 50% for 22 hrs. at 72° C.

These data clearly indicate that substitution of 5% to 40% of the triol with the amine had a significant effect on foam properties. Foams containing 5% to 40% of the amine (based on total polyol) had a very soft, velvety feel with improved tensile and elongation properties as compared to a 100% triol foam. From the data, it can be seen that incorporation of as little as 5% of the amine into the formulation results in a much softer foam (compression-deflection).

*Example II*

The following formulation and procedure has been used to prepare one-shot flexible foams from mixtures of 3,000 molecular weight triol and a 3,000 molecular weight amine of the average formula:

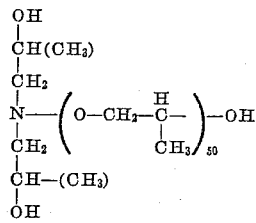

The amine was substituted directly for the triol in the formulation.

TABLE II

| | P.b.w. |
|---|---|
| Triol and amine | 200 |
| Water | 5.8 |
| Triethylenediamine | 0.2 |
| Silicone oil | 2 |
| N-ethylmorpholine | 1 |
| Stannous octoate | 0.6 |
| Toluene diisocyanate (80/20 mixed isomers) | 80 |

All of the reactants except the toluene diisocyanate were stirred one minute at 1,400 r.p.m. using two 1.5 in., stainless steel, propeller-type agitators. Toluene diisocyanate was then added and stirring was continued an additional 10 to 12 seconds. After rising to full height the foams were cured one hour at 73° C., crushed and then cured 24 hours at 73° C. Results of this study are given in the following table.

TABLE III

| | Foam No. | | | |
|---|---|---|---|---|
| | 2154-40a | 2201-42a | 2201-42b | 2201-42c |
| Triol | 200 | 190 | 180 | 160 |
| Amine | | 10 | 20 | 40 |
| Water | 5.8 | 5.8 | 5.8 | 5.8 |
| Triethylenediamine | 0.2 | 0.2 | 0.2 | 0.2 |
| Silicone oil | 2 | 2 | 2 | 2 |
| N-ethylmorpholine | 1 | 1 | 1 | 1 |
| Stannous octoate | 0.6 | 0.6 | 0.6 | 0.6 |
| Toluene diisocyanate | 80 | 80 | 80 | 80 |
| Physical properties: | | | | |
| Density, pcf | 2.3 | 2.1 | 2.1 | 2.2 |
| Compression set,[1] percent | 6.7 | 6.6 | 8.0 | 9.5 |
| Tensile strength, p.s.i. | 14.5 | 15.4 | 16.1 | 16.2 |
| Ultimate elongation, percent | 215 | 209 | 257 | 250 |
| Tear resistance, p.s.i. | 3.6 | 2.7 | 3.1 | 3.4 |
| Compression-deflection: | | | | |
| P.s.i. at 25% deflection | 0.53 | 0.37 | 0.41 | 0.43 |
| P.s.i. at 50% deflection | 0.72 | 0.51 | 0.55 | 0.59 |

[1] 50% for 22 hrs. at 73° C.

Having thus described my invention, what is claimed is:

1. In the preparation of flexible polyurethane foam by the reaction of an organic diisocyanate with a triol in the presence of a blowing agent and a foam stabilizing agent, the improvement which comprises replacing from about 5 to about 40 wt. percent of said triol with a monoamine, said triol having a molecular weight within the range of from about 2,500 to about 4,000 and having been prepared by reacting an alcohol initiator containing an average of about three active hydrogen atoms with from about 80 to about 100 wt. percent of propylene oxide and, correspondingly, from about 20 to about 0 wt. percent of ethylene oxide, said monoamine having the formula:

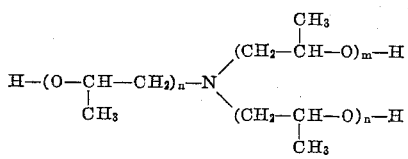

wherein $m$ is an integer having a value of from about 15 to about 55 and $n$ is an integer having a value of 0 to 1.

2. A method as in claim 1 wherein $n$ has a value of 1.
3. A method as in claim 1 wherein $n$ has a value of 0.
4. A product prepared by the process of claim 1.

References Cited

UNITED STATES PATENTS

| 3,042,631 | 7/1962 | Strandskov | 260—2.5 |
| 3,094,434 | 6/1963 | Chapman et al. | 260—2.5 XR |
| 3,110,732 | 11/1963 | Speranza et al. | 260—584 |
| 3,194,773 | 7/1965 | Hostettler et al. | 260—2.5 |
| 3,231,619 | 1/1966 | Speranza | 260—584 |

FOREIGN PATENTS 868,996  5/1961  Great Britain.

OTHER REFERENCES

Gaylord: Polyethers, Part I (1963), pages 224, 225 and 235–237 cited as being of interest.

DONALD E. CZAJA, *Primary Examiner.*

F. McKELVEY, *Assistant Examiner.*